US 6,732,040 B2

(12) United States Patent
Sangeeta et al.

(10) Patent No.: US 6,732,040 B2
(45) Date of Patent: May 4, 2004

(54) WORKSCOPE MIX ANALYSIS FOR MAINTENANCE PROCEDURES

(75) Inventors: D Sangeeta, Cincinnati, OH (US); Adam Timothy Luthman, Cincinnati, OH (US)

(73) Assignee: General Electric Company, Schnectady, NY (US)

( * ) Notice: Subject to any disclaimer, the term of this patent is extended or adjusted under 35 U.S.C. 154(b) by 66 days.

(21) Appl. No.: 10/078,902

(22) Filed: Feb. 19, 2002

(65) Prior Publication Data

US 2003/0167117 A1 Sep. 4, 2003

(51) Int. Cl.[7] ............................................... G06F 17/60
(52) U.S. Cl. ............................ 701/100; 701/29; 703/8; 477/30; 477/31
(58) Field of Search ........................... 701/100, 29, 30, 701/33, 34, 43, 19; 340/825.54, 825.52; 702/183, 185, 3, 4, 179, 81, 84; 706/913; 703/6, 7, 13, 18, 8; 705/7, 8, 19; 709/203, 227; 356/394; 477/30, 31; 707/1

(56) References Cited

U.S. PATENT DOCUMENTS 5,737,215 A    4/1998   Schricker et al. ........... 364/149
6,158,207 A  * 12/2000  Polenick et al. ........... 60/39.02
6,226,597 B1    5/2001  Eastman et al. ............... 702/34
6,243,628 B1    6/2001  Bliley et al. .................... 701/29
2001/0032109 A1 * 10/2001 Gonyea et al. .................. 705/8
2002/0035495 A1 *  3/2002 Spira et al. ..................... 705/7
2002/0052712 A1 *  5/2002 Voser et al. .................. 702/182
2002/0128790 A1 *  9/2002 Woodmansee ............... 702/81

* cited by examiner

*Primary Examiner*—Thomas G. Black
*Assistant Examiner*—Tuan C To
(74) *Attorney, Agent, or Firm*—Gregory O. Garmong; Carmen Santa Maria; McNees Wallace & Nurick LLC

(57) ABSTRACT

Maintenance procedures for an article such as a component of a gas turbine engine are analyzed by defining a set of workscopes that may be performed upon the article, gathering maintenance frequency information for each type of subsequent trailing workscope that may be performed after a prior leading workscope, for a sample set of maintenance procedures, and determining a measured sample workscope mix in the form of a set of trailing workscope probabilities as a function of each leading workscope. A projected workscope mix is projected for a set of maintenance procedures from the measured sample workscope mix. From the projected workscope mix, labor, supplies, and monetary estimates for maintenance procedures may be calculated. Alternative maintenance strategies may be readily compared using this approach.

17 Claims, 3 Drawing Sheets

_US 6,732,040 B2_

WORKSCOPE MIX ANALYSIS FOR MAINTENANCE PROCEDURES

This invention relates to the analysis of maintenance procedures for complex machinery such as gas turbine engines and, more particularly, to predicting maintenance procedures and to comparing alternative maintenance procedures.

BACKGROUND OF THE INVENTION

Aircraft engines and other complex, safety-critical machines are inspected and repaired on a routine basis. A routine inspection occurs at a preselected point, such as after a preselected number of flight hours or flight cycles in the case of the aircraft engine. At these points, the machine is taken out of service, disassembled as necessary, inspected as necessary, and repaired as necessary. This process is collectively termed a maintenance procedure.

In some cases, the repair of each component performed during the maintenance procedure may include any one of several workscopes. For example, the component may require only a light cleaning. It may instead require a more major repair, or in extreme cases the component may be scrapped and replaced by a new version of the same component. Gradations in these repairs may also be identified. In an aircraft gas turbine engine, for example, the turbine vanes are expensive and are subjected to extremely aggressive environments during service. Upon disassembly of the engine, the turbine vanes are inspected. Depending upon its individual condition, each turbine vane is cleaned only, repaired by welding, recoating, or other process, or replaced if the turbine vane is too damaged to be readily repaired. Each of the workscopes have associated labor requirements, supplies requirements, and financial implications.

The maintenance procedure for each gas turbine engine is typically performed many times over the life of the gas turbine engine, necessitating multiple shop visits for the engine. While the decisions as to what repairs are performed on each component at each shop visit are made primarily on the basis of technical criteria, there is a need for an approach that will allow owners and maintenance facilities to predict the labor and supplies requirements as well as the financial implications for each engine or other complex machine at each shop visit, as well as for an entire fleet of engines or other machines. The present invention fulfills this need, and further provides related advantages.

SUMMARY OF THE INVENTION

The present invention provides an approach for analyzing maintenance procedures for an article such as a component of a gas turbine engine, and for entire fleets of engines with those components (i.e., the same components present on each engine of the fleet of engine). The approach allows samples of the maintenance data to be used to predict entire maintenance procedures as well as the labor requirements, supply requirements, and financial implications. Further, this approach allows alternative maintenance procedures to be comparatively evaluated. The preferred embodiment deals with the analysis of maintenance procedures for aircraft gas turbine engines, but the present approach is equally applicable to other articles.

A method for analyzing maintenance procedures for an article such as a component of a gas turbine engine comprises the steps of providing the article, defining a set of workscopes that may be performed upon the article, and gathering maintenance frequency information for each type of subsequent trailing workscope that may be performed after a prior leading workscope, for a sample set of maintenance procedures. A measured sample workscope mix in the form of a set of trailing workscope probabilities is determined as a function of each leading workscope, using the maintenance frequency information from the step of gathering. The method further includes projecting a projected workscope mix for a set of maintenance procedures from the measured sample workscope mix. To verify the approach, a measured workscope mix may be determined and compared with the projected workscope mix.

In one application of the method, there is established a labor requirement, a supplies requirement, and/or a monetary value for each workscope. A respective labor requirement, supplies requirement, and/or monetary value for the projected workscope mix is thereafter calculated from the labor requirement for each workscope and the projected workscope mix. The labor requirement, supplies requirement, and/or monetary value (cost or price) for an entire set of maintenance procedures may thus be estimated from a sampling of the maintenance procedures.

In another application, the method further includes defining a second set of second workscopes for the article, and second gathering second maintenance frequency information for each type of subsequent second trailing workscope that may be performed after a second leading workscope, for a second sample set of maintenance procedures. The method further includes second determining a second measured sample workscope mix in the form of a set of second trailing workscope probabilities as a function of each second leading workscope, using the second maintenance frequency information from the step of second gathering, and second projecting a second projected workscope mix for a second set of second maintenance procedures from the second measured sample workscope mix. The (original) projected workscope mix and the second projected workscope mix are compared, typically as to labor requirements, supplies requirements, and/or monetary value. This approach allows different repair strategies to be compared over the entire set of maintenance procedures. Thus, for example, while a repair modification may produce a lower per-repair cost, evaluation by the present approach may show that the repair modification may result in greater repair costs when evaluated over the entire set of maintenance procedures and multiple shop visits.

In yet another application, these principles may be extended to an entire fleet of articles by providing maintenance status information for the fleet of articles, and projecting a projected fleet workscope mix for a set of maintenance procedures from the measured sample workscope mix and the maintenance status information.

Further, the results for any one component may be combined with those for other components of the engine or other machine, so that the totality of maintenance requirements may be evaluated for a single engine or the entire fleet of engines.

The present approach builds a statistical picture of the effects of alternative maintenance procedures (i.e., the leading workscopes) by assessing the frequencies of the subsequently required maintenance procedures (i.e., the trailing workscopes). The statistical picture allows the maintenance facility to plan its labor and supplies requirements, inventories, and the like. It also allows various alternative approaches to be evaluated. In an extreme example that illustrates the potential of this approach, if a first repair is inexpensive to apply in a first shop visit but results in a requirement that the component be scrapped in the next shop visit, it may be preferable to utilize a second repair that is slightly more expensive than the first repair but has a low scrap replacement level in the next repair. The present approach allows more sophisticated probabilistic judgments of this type to be made based on limited empirical data.

This technique is useful for both the owner of the engine and the provider of the maintenance services. The owner is able to project costs of ownership of the engine over time and cash flow, according to various maintenance requirements and workscope strategies. The provider of the maintenance services is able to project costs of providing services, to schedule labor and inventory of supplies for the maintenance services, and to evaluate alternative approaches to providing the maintenance services (i.e., the effect of introducing alternative workscopes). The present approach is also useful as a predictive tool. For example, if a new workscope were developed that successfully reduced the number of scrap replacements by a reconditioning process, an important question is when should the new workscope first be introduced. The present approach may show that introduction of the new workscope is not economically justified until after a certain number of shop visits have been experienced, and the full development and qualification may be scheduled with that information in mind.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
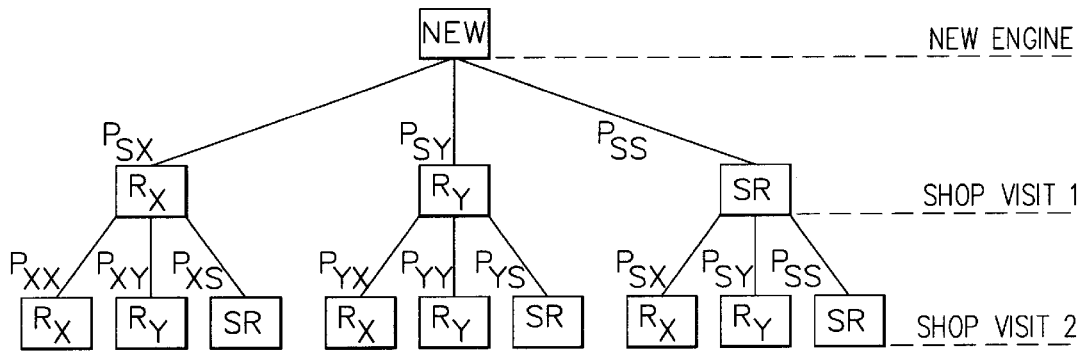
FIG. 1 is an exemplary leading workscope/trailing workscope tree with generalized probabilities indicated.

The present invention is concerned with analyzing maintenance procedures for an article such as a component of a gas turbine engine. The maintenance of gas turbine engines is of interest to the inventors, but the analytical process applies equally well to other machines that are removed from service for maintenance procedures.

During a maintenance procedure performed on the article, a "workscope" is performed. A "workscope" is a task of a well-defined extent and nature. For the maintenance of gas turbine engines, workscopes of different types are typically set forth in maintenance manuals that are carefully followed by the technicians who perform the maintenance procedures. To cite a specific example which is provided for illustration and not by way of limitation, for the case of a turbine vane component of a gas turbine engine that has previously been in service, a first workscope Rx may include cleaning the turbine vane of deposited hydrocarbons and other residue; a second, more extensive workscope Ry may include the removing of coatings on the airfoil of the turbine vane, weld repairing of cracks and other areas at which there has been a loss of metal, and recoating of the turbine vane; a third workscope SR is a scrapping of the turbine vane and its replacement by a newly manufactured turbine vane. These workscopes Rx, Ry, and SR require different labor and supplies, and also have different associated monetary values in cost to the organization performing the workscope and price to the organization paying for the workscope. In this case, the labor, supplies, and associated monetary values increase in the order Rx, Ry, and SR. In practice, the workscopes for the turbine vane are not limited to only these three workscopes, and in fact there may be others. These three workscopes are presented to provide a concrete illustrative example for the subsequent discussion. In any analysis, all of the workscopes that are available to be performed on the component in the maintenance procedure are considered, inasmuch as their probabilities of being performed add to 1.0 (recognizing that there may be small numerical rounding variations).

The maintenance procedures are performed in discrete blocks at specific inspection points. That is, it is not the general practice to check, for example, 5 percent of the turbine vanes each day. Instead, all of the turbine vanes, as well as the other engine components, are checked when the engine is taken out of service for routine inspections. Such inspections, and the associated workscopes, are termed "shop visits". It is expected that a gas turbine engine will have multiple shop visits during its service life.

The approach of the present invention recognizes that the required maintenance procedures performed in any shop visit are related to the maintenance procedures performed in the prior shop visit. The prior shop visit is termed the "leading shop visit" and the prior workscope is termed the "leading workscope"; the next subsequent shop visit is termed the "trailing shop visit" and the next subsequent workscope is termed the "trailing workscope".

FIG. 1 presents a workscope tree which illustrates the interrelation between the leading and trailing workscopes. In the figures, "New" indicates a new component, and Rx and Ry indicate workscopes of lesser magnitude than SR (scrap replacement) in which the component is scrapped and replaced by a new component.

The interrelation of the leading and trailing workscopes may be indicated by probabilities. Thus, in the workscope tree shown in FIG. 1, the probability that the New component will require a workscope Rx performed in shop visit 1 is Psx, the probability that the New component will require a workscope Ry in shop visit 1 is Psy, and the probability that the New component will require a workscope SR in shop visit 1 is Pss. (The New component is the same as that introduced during an SR procedure.) In each case, the first subscript i in Pij denotes the leading workscope and the second subscript j in Pij denotes the trailing workscope. The Pij values are termed "maintenance frequency values" because they indicate the frequency of trailing workscopes as a function of leading workscopes. Extending this principle to the second shop visit, the probability that a component which has been given an Rx workscope in shop visit 1 will require an Rx workscope in shop visit 2 is Pxx, the probability that a component which has been given an Rx workscope in shop visit 1 will require an Ry workscope in shop visit 2 is Pxy, and so on. For the illustrative case, all of the Pij values are defined and experienced no later than shop visit 2.

Figure 2:
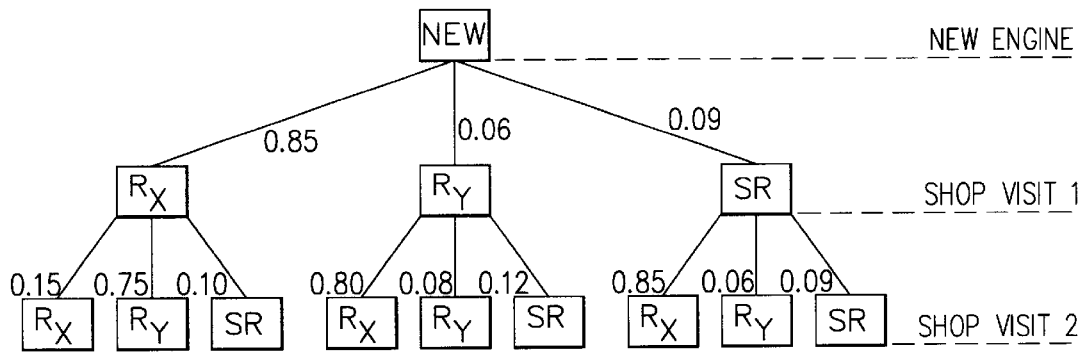
FIG. 2 is the workscope tree of FIG. 1, but with specific measured probabilities added.
Figure 3:
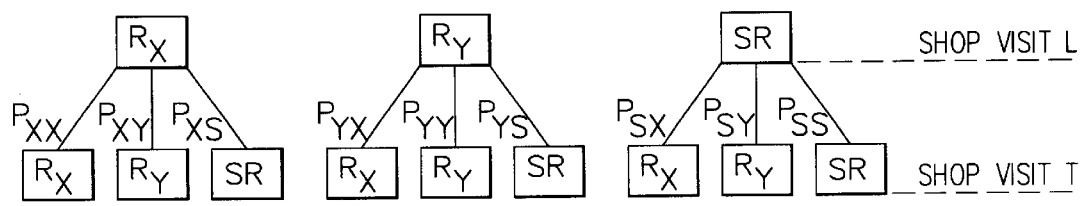
FIG. 3 is an extension of the workscope tree of FIG. 1, for the Lth (nth) and Tth (nth+1) shop visits.

FIG. 2 shows the same workscope tree as FIG. 1, with some numerical values of the probabilities substituted for the Pij values, for illustration. (These numerical values, as with all of the numerical values set forth herein, are not drawn from real experience but are instead provided as the basis for illustrations.) In some cases by definition, and in other cases to a good approximation, the Pij values are always the same between any two shop visits. Following an SR workscope, the component is a new component, and it may therefore be expected that the Psj values will be the same as the Psj values for the New component. And, to a good approximation as shown in FIG. 3, for any general pair of leading (L) shop visit, the nth shop visit, and trailing (T) shop visit, the (nth+1) shop visit, the Pij values will be the same as for all other shop visits. The present approach may also be utilized where the Pij values are not the same for every shop visit. For example, the Pij values may be the same every second shop visit. Or the Pij values may vary in some specified manner reflecting repair history as a function of the number of the shop visit, as Pij,n. The present approach is described herein for the case of scheduled shop visits, but it may also be used for unscheduled shop visits, such as those performed at an unscheduled engine removal. In general, the Pij values for scheduled shop visits and unscheduled shop visits are not the same and must be separately determined.

Based upon this analysis, workscope trees like those of FIGS. 1–2 may be constructed for multiple shop visits. Rather than drawing such expanded workscope trees, the interrelationship of the leading and trailing workscopes in the leading and trailing shop visits, at all levels of the tree and for all shop visits, may be summarized in the following workscope mix table or matrix:

TABLE 1

|  |  | Leading Workscope | |
|---|---|---|---|
| Workscope Mix Table | Rx | Ry | SR |
| Trailing | Rx | Pxx | Pyx | Psx |
| Workscope | Ry | Pxy | Pyy | Psy |
|  | SR | Pxs | Pys | Pss |

Figure 4:
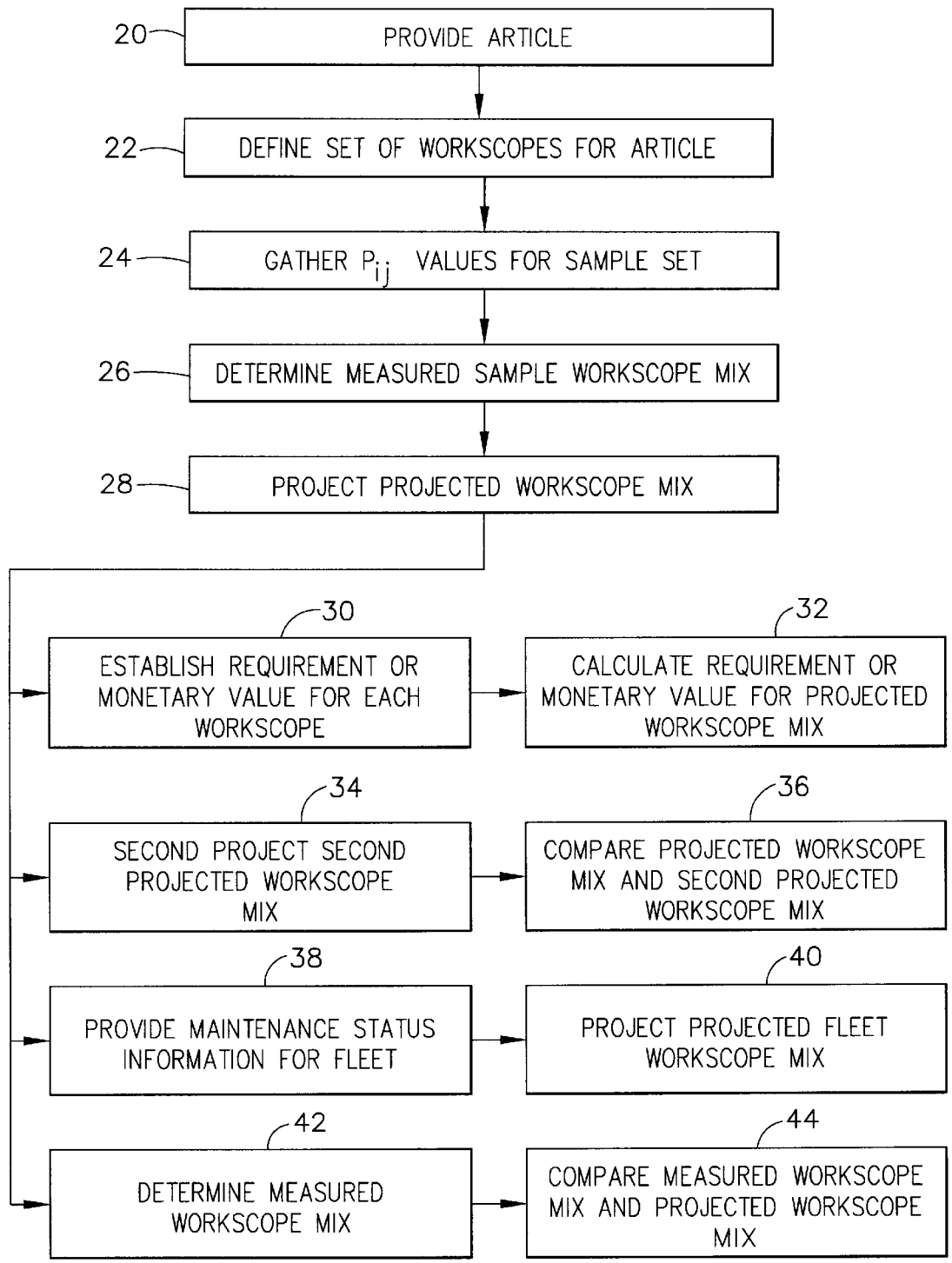
FIG. 4 is a block flow diagram of a preferred approach for practicing the present approach.

FIG. 4 depicts a preferred approach for practicing the present invention in developing and using the workscope mix table. The article, such as the component of the gas turbine engine, is provided, numeral 20. The set of workscopes is defined for that article, numeral 22. The workscopes are specific to each article, and an example for the case of the turbine vane component of the gas turbine engine is presented above.

Maintenance frequency information Pij for each type of subsequent trailing workscope that may be performed after a prior leading workscope is gathered, for a sample set of maintenance procedures, numeral 24. This step 24 is an empirical gathering of data that is typically performed for any two shop visits, such as the second and first shop visits. The more information that is gathered, the greater should be the accuracy of the numerical Pij values. This gathering of information 24 supplies the numerical Pij values, as is shown for the exemplary Pij values of FIG. 2, that are used for projecting the workscope mix for subsequent shop visits. From these data, the numerical values in a measured workscope mix table are determined, numeral 26. Such a table is similar to Table 1 above, but with numerical values entered for the Pij values.

A projected workscope mix is projected from this information, numeral 28. This projection is made on the basis that Pij for the (nth+1) shop visit is equal to Pij for the nth shop visit. For example, Pxy for the tenth shop visit is equal to Pxy for the second shop visit, or 0.75 in the numerical example shown in FIG. 2. A workscope tree like that of FIGS. 1–2 is developed or, more compactly, a table of values may be prepared. The workscope tree expands to more individual branches as the number of shop visits increases, and each workscope may be reached by more paths. To determine the total number of workscopes of a particular type for the nth visit, the Pij values for the workscopes of that type reached by the various paths are summed. Table 2 summarizes the numerical sums of the individual Pij values for each of the three types of workscopes in the earlier-presented example, for each shop visit in a set of 10 shop visits. These data are presented as a numerical example.

TABLE 2

| Shop Visit | SR | Rx | Ry |
|---|---|---|---|
| 1 | .09 | .85 | .06 |
| 2 | .10 | .25 | .65 |
| 3 | .11 | .64 | .25 |
| 4 | .10 | .39 | .51 |
| 5 | .11 | .55 | .34 |
| 6 | .10 | .45 | .45 |
| 7 | .10 | .52 | .38 |
| 8 | .10 | .48 | .43 |
| 9 | .10 | .51 | .40 |
| 10 | .10 | .49 | .42 |

These SR, Rx, and Ry values add horizontally to 1.0 (with slight rounding errors in some cases). The information may be interpreted as follows. For each 100 of the articles on the engine, the probability of the workscope being required at the nth shop visit is the individual Pij probabilities shown in that row. In the above example, at the fifth shop visit, it is expected that 11 of the components will require the SR workscope, 55 of the components will require the Rx workscope, and 34 of the components will require the Ry workscope.

An inspection of Table 2 yields insights as to the nature of the workscopes that are required as the number of shop visits increases. For this particular data set, for shop visit 4 and higher, the workscope mix stabilizes so that the probabilities do not vary greatly from shop visit to shop visit.

The projected workscope mix of Table 2 may be further used in various ways, and some examples are presented in FIG. 4. In one application, a requirement V, such as a labor, supplies, or monetary value, for each workscope is established, numeral 30. Table 3 summarizes these values:

TABLE 3

| Workscope | Value, V |
|---|---|
| SR | Vsr |
| Rx | Vx |
| Ry | Vy |

The values V may be any amount associated with the workscope. For example, V may be a number of hours of skilled labor required to perform the workscope, the cost of supplies required to perform the task, the amount of supplies required to perform the task (e.g., gallons of acid, number of hours in an oven to assess total oven requirements, etc.), or the monetary value in terms of cost to the operator of the shop or price to the owner of the article that is ordering the maintenance. The requirement or monetary value at each shop visit for each article type is calculated by multiplying the numerical value of V in Table 3 times the associated workscope in FIG. 2 times the number of articles under consideration, numeral 32. For example, the total number of hours of labor for Rx workscopes in shop visit 4 is 0.39 times the number of articles to be repaired times Vx, where Vx is the labor required per Rx workscope. By this approach, the total requirements or monetary value V at each shop visit may be estimated, allowing the shop and the owner to plan their work more precisely.

Another important application of the present approach is to compare various maintenance strategies. For example, a new workscope Rz may be developed in addition to the Rx, Ry, and SR workscopes, creating a second workscope mix. To evaluate the effect of adding workscope Rz to the maintenance procedures, the prior steps 22, 24, 26, and 28 are repeated for this second set of workscopes (Rx, Ry, Rz, SR), numeral 34. A new Workscope Mix Table is defined:

TABLE 4

| Workscope Mix Table | | Leading Workscope | | |
|---|---|---|---|---|
| | Rx | Ry | Rz | SR |
| Trailing Workscope | Rx | P'xx | P'yx | P'zx | P'sx |
| | Ry | P'xy | P'yy | P'zy | P'sy |
| | Rz | P'xz | P'yz | P'zz | P'sz |
| | SR | P'xs | P'ys | P'zs | P'ss |

The projected workscope mix of step 28, which is shown in Table 2 for the original workscope set of Rx, Ry, and SR, is also prepared for this second workscope mix of Table 4. The values set forth in Table 3, supplemented by a value V for the additional workscope Rz, are multiplied by the projected workscope mix and the number of articles to obtain comparable information for the second set of workscopes (Rx, Ry, Rz, SR). The results are compared with the results for the original set of workscopes (Rx, Ry, SR), numeral 36, using the approach set forth in steps 30, 32 or otherwise. The results allow comparisons of the two different sets of workscopes over the projected shop visits. Thus, for example, the new workscope Rz may seem attractive upon first consideration, but further study by the present analysis may demonstrate that addition of the new workscope Rz actually increases total costs over the total number of shop visits. This type of situation and the need for the present evaluation commonly arises as engineers develop improved repair techniques, but it must be determined whether the improved repair techniques should be adopted. In a variation, this approach may be used to determine a point (i.e., the shop visit number) at which the (original) set of workscopes should be discontinued and the second set of second workscopes should be introduced to replace the first set.

The analysis presented to this point has dealt with the articles that are present in a single engine or other machine. The maintenance analysis techniques may be extended to apply to an entire fleet of the engines or other machines. Maintenance status information is provided for the fleet of articles, numeral 38. The maintenance status information is the total of the number of machines that have completed the indicated shop visit. The members of the fleet are placed in service at different times, so they are not all at the same shop visit point in their lives. For each shop visit MV, there are $N_{MV}$ engines or other machines that have completed that shop visit and are in service or ready to return to service. A projected fleet workscope mix for each shop visit may be projected, numeral 40, from the measured sample workscope mix and the maintenance status information. Table 5 presents such a projection for the data of Table 2, the (Rx, Ry, SR) workscope mix that has been used as an example above, and an $N_{MV}$ status, and assuming 50 of the articles per engine:

TABLE 5

| Shop Visit | $N_{MV}$ | SR | Rx | Ry |
|---|---|---|---|---|
| 1 | 0 | 0 | 0 | 0 |
| 2 | 17 | 85 | 214 | 551 |
| 3 | 18 | 101 | 577 | 222 |
| 4 | 10 | 50 | 195 | 255 |
| 5 | 11 | 61 | 303 | 187 |
| 6 | 20 | 100 | 450 | 450 |
| 7 | 18 | 90 | 468 | 342 |
| 8 | 15 | 75 | 360 | 323 |
| 9 | 4 | 20 | 98 | 84 |
| 10 | 0 | 0 | 0 | 0 |

This Table 5 summarizes the projected fleet workscope mix for the prior numerical example extended to many engines, each with 50 of the articles being analyzed.

In yet another application of the present approach, a measured workscope mix is determined, either for one engine or for the fleet, numeral 42. The measured workscope mix is then compared with the projected workscope mix, as presented in Tables 2 or 5, numeral 44. The comparison indicates the viability of the present approach, and allows Pij values to be adjusted as necessary. This verification approach allows the estimation process to be continually refined and the values updated, so as to continually improve the values used in the model.

Figure 5:
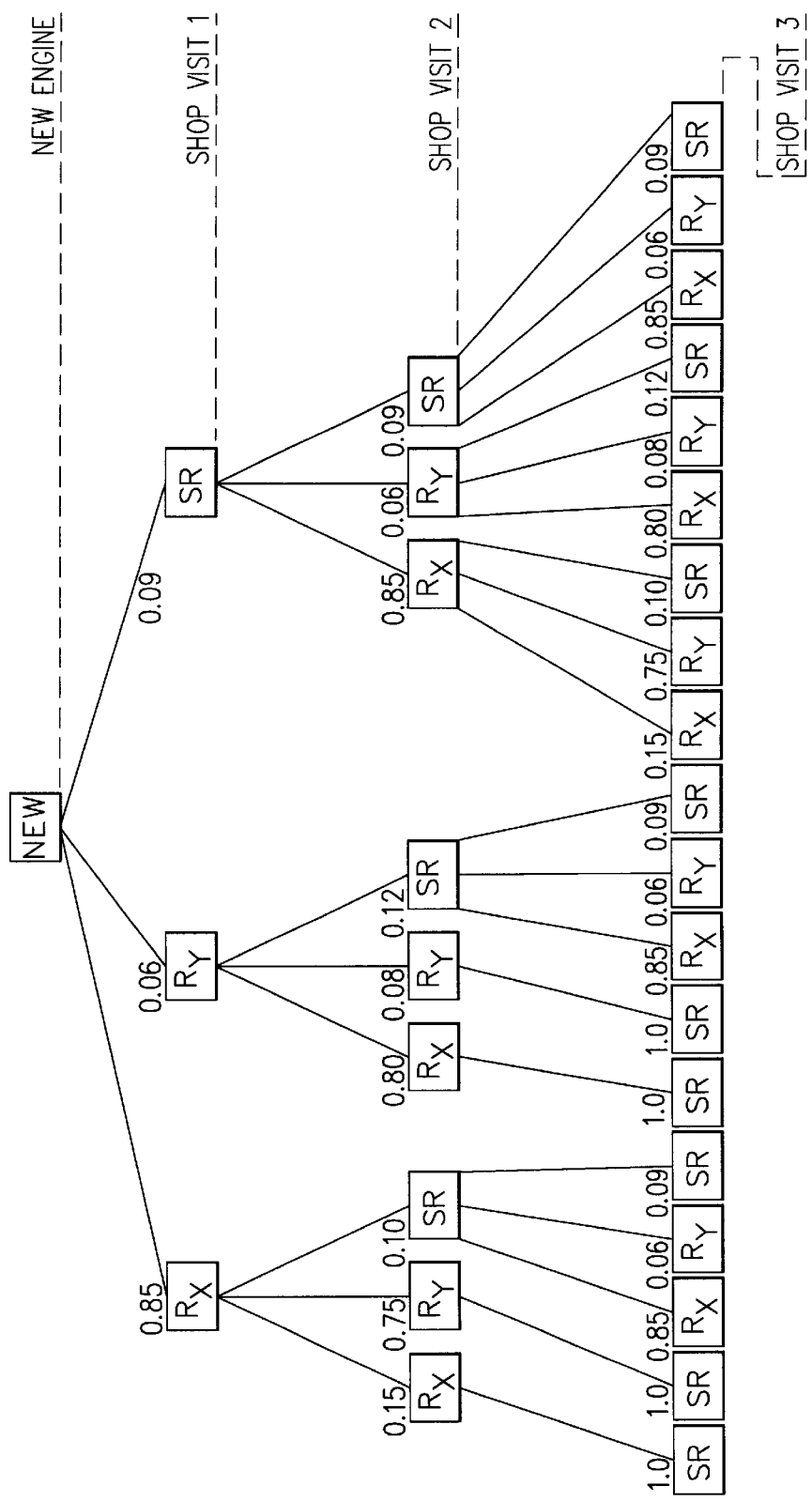
FIG. 5 is a workscope tree for a variation of the present approach.

In a further variation, the present approach may be applied to articles that are permitted to have only a limited number of repairs before being replaced. In the prior example illustrated by FIGS. 1–3, the article may be repaired as many times as needed. Some articles, however, are permitted to be repaired only a specified number of times before they are necessarily replaced even if they are potentially repairable. Such replacements are usually made for safety reasons. FIG. 5 illustrates such an approach, where the article, such as a turbine blade, is necessarily replaced after it has been repaired twice. At the time of the third shop visit in this example, all articles that have been repaired twice before (by either Rx or Ry) are placed in the SR category, with a 1.0 probability. The workscope tree may be extended to later shop visits by the techniques discussed earlier. The same analytical techniques discussed earlier for the example illustrated by FIGS. 1–3 are applicable to this case, once the relationships of the workscope tree of FIG. 5 are established.

The present approach has been reduced to practice for gas turbine engine components.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for analyzing maintenance procedures for an article, comprising the steps of:

providing the component of the gas turbine engine;

defining a set of workscopes that may be performed upon the article;

gathering maintenance frequency information for each type of subsequent trailing workscope that may be performed after a prior leading workscope, for a sample set of maintenance procedures;

determining a measured sample workscope mix in the form of a set of trailing workscope probabilities as a function of each leading workscope, using the maintenance frequency information from the step of gathering; and projecting a projected workscope mix for a set of maintenance procedures from the measured sample workscope mix.

2. The method of claim 1, including an additional step, after the step of projecting, of establishing a labor requirement for each workscope, and thereafter calculating a labor requirement for the projected workscope mix from the labor requirement for each workscope and the projected workscope mix.

3. The method of claim 1, including an additional step, after the step of projecting, of establishing a supplies requirement for each workscope, and thereafter calculating a supplies requirement for the projected workscope mix from the supplies requirement for each workscope and the projected workscope mix.

4. The method of claim 1, including an additional step, after the step of projecting, of establishing a monetary value for each workscope, and thereafter calculating a monetary value for the projected workscope mix from the monetary value for each workscope and the projected workscope mix.

5. The method of claim 1, including additional steps, after the step of projecting, of determining a measured workscope mix, and comparing the measured workscope mix and the projected workscope mix.

6. The method of claim 1, including additional steps, after the step of projecting, of second defining a second set of second workscopes for the component of the gas turbine engine, second gathering second maintenance frequency information for each type of subsequent second trailing workscope that may be performed after a prior second leading workscope, for a second sample set of maintenance procedures, second determining a second measured sample workscope mix in the form of a set of second trailing workscope probabilities as a function of each second leading workscope, using the second maintenance frequency information from the step of second gathering, second projecting a second projected workscope mix for a second set of second maintenance procedures from the second measured sample workscope mix, and comparing the projected workscope mix and the second projected workscope mix.

7. The method of claim 6, wherein the step of comparing includes the step of establishing a labor requirement for each set of workscopes and each set of second workscopes, and thereafter calculating labor requirements for the projected workscope mix and the second projected workscope mix from the labor requirements for each respective workscope and each respective projected workscope mix.

8. The method of claim 6, wherein the step of comparing includes the step of establishing a supplies requirement for each set of workscopes and each set of second workscopes, and thereafter calculating supplies requirements for the projected workscope mix and the second projected workscope mix from the supplies requirements for each respective workscope and each respective projected workscope mix.

9. The method of claim 6, wherein the step of comparing includes the step of establishing a monetary value for each set of workscopes and each set of second workscopes, and thereafter calculating monetary value for the projected workscope mix and the second projected workscope mix from the monetary value for each respective workscope and each respective projected workscope mix.

10. The method of claim 1, wherein the step of providing the article includes the step of providing a gas turbine engine.

11. The method of claim 1, including an additional step of providing maintenance status information for a fleet of the component of the gas turbine engines, and projecting a projected fleet workscope mix for a set of maintenance procedures from the measured sample workscope mix and the maintenance status information.

12. A method for analyzing maintenance procedures for a component of a gas turbine engine, comprising the steps of:

providing the component of the gas turbine engine;

defining a set of workscopes that may be performed upon the component of the gas turbine engine;

gathering maintenance frequency information for each type of subsequent trailing workscope that may be performed after a prior leading workscope, for a sample set of maintenance procedures;

determining a measured sample workscope mix in the form of a set of trailing workscope probabilities as a function of each leading workscope, using the maintenance frequency information from the step of gathering; and projecting a projected workscope mix for a set of maintenance procedures from the measured sample workscope mix.

13. The method of claim 12, including an additional step, after the step of projecting, of establishing a labor requirement for each workscope, and thereafter calculating a labor requirement for the projected workscope mix from the labor requirement for each workscope and the projected workscope mix.

14. The method of claim 12, including an additional step, after the step of projecting, of establishing a supplies requirement for each workscope, and thereafter calculating a supplies requirement for the projected workscope mix from the supplies requirement for each workscope and the projected workscope mix.

15. The method of claim 12, including an additional step, after the step of projecting, of establishing a monetary value for each workscope, and thereafter calculating a monetary value for the projected workscope mix from the monetary value for each workscope and the projected workscope mix.

16. The method of claim 12, including additional steps, after the step of projecting, of determining a measured workscope mix, and comparing the measured workscope mix and the projected workscope mix.

17. The method of claim 12, including additional steps, after the step of projecting, of second defining a second set of second workscopes for the component of the gas turbine engine, second gathering second maintenance frequency information for each type of subsequent second trailing workscope that may be performed after a prior second leading workscope, for a second sample set of maintenance procedures, second determining a second measured sample workscope mix in the form of a set of second trailing workscope probabilities as a function of each second leading workscope, using the second maintenance frequency information from the step of second gathering, second projecting a second projected workscope mix for a second set of second maintenance procedures from the second measured sample workscope mix, and comparing the projected workscope mix and the second workscope projection.

* * * * *